United States Patent [19]
Lyons

[11] Patent Number: 5,864,557
[45] Date of Patent: *Jan. 26, 1999

[54] METHOD AND APPARATUS FOR OPPORTUNISTICALLY TRANSFERRING DATA IN A PACKET STREAM ENCODER

[75] Inventor: Paul Wallace Lyons, New Egypt, N.J.

[73] Assignee: Thomson multimedia S.A., Courbevoie, France

[*] Notice: The term of this patent shall not extend beyond the expiration date of Pat. No. 5,574,505.

[21] Appl. No.: 719,807

[22] Filed: Sep. 25, 1996

[51] Int. Cl.$^6$ ........................................................ H04J 3/00
[52] U.S. Cl. ........................... 370/444; 370/458; 370/473; 348/426
[58] Field of Search ..................................... 370/400, 444, 370/458, 473, 501, 465; 348/423, 426, 465

[56] References Cited

U.S. PATENT DOCUMENTS

| | | | |
|---|---|---|---|
| 4,587,651 | 5/1986 | Nelson et al. | 370/458 |
| 5,111,292 | 5/1992 | Kuriacose et al. | 358/133 |
| 5,115,309 | 5/1992 | Hang | 358/133 |
| 5,235,595 | 8/1993 | O'Dowd | 370/400 |
| 5,365,272 | 11/1994 | Siracusa | 348/426 |
| 5,455,629 | 10/1995 | Sun et al. | 348/466 |
| 5,504,823 | 4/1996 | Yoon | 382/233 |
| 5,510,844 | 4/1996 | Cash et al. | 348/465 |
| 5,517,250 | 5/1996 | Hoogenboom et al. | 348/467 |
| 5,574,505 | 11/1996 | Lyons et al. | 348/426 |

Primary Examiner—Douglas W. Olms
Assistant Examiner—Shick Hom
Attorney, Agent, or Firm—Joseph S. Tripoli; Eric P. Herrmann; Ronald H. Kurdyla

[57] ABSTRACT

A transport stream encoder comprises a plurality of component signal sources. One of the component signals sources is a source of an opportunistic data component signal carrying a block of data having a predetermined size to be transferred within a predetermined period of time. A packet generator is coupled to the plurality of component signal sources, and produces a composite packet stream, partitioned into successive groups containing a plurality of packet slots. A memory stores a plurality of priority lists respectively associated with the plurality of packet slots. Each priority list contains a plurality of entries, and each entry contains data representing a respective one of the plurality of component signal sources. A scheduler is responsive to the entries in the plurality of priority lists and conditions the packet generator to generate a packet for each one of the packet slots. The generated packet contains data from a component signal source selected from among the component signal sources having representative data in the entries in the priority list associated with that packet slot. A processor modifies the entries in the plurality of priority lists in such a manner as to ensure that a packet containing data from the opportunistic data component signal source is generated with sufficient time regularity to guarantee that the block of data is transferred within the predetermined time period.

11 Claims, 2 Drawing Sheets

METHOD AND APPARATUS FOR OPPORTUNISTICALLY TRANSFERRING DATA IN A PACKET STREAM ENCODER

FIELD OF THE INVENTION

The present invention relates to a method and apparatus for transferring data over a packet slot transport system on an opportunistic basis. In particular this method adaptively changes the priority assignment of a data component signal in a composite packet stream in such a manner as to guarantee transmission of a predetermined amount of data carried by that component signal within a predetermined time period.

BACKGROUND OF THE INVENTION

Currently, packet transport systems are being used to distribute entertainment programming. For example, a satellite packet transport system may transport a plurality of television channels to viewer locations, each television channel containing a video signal and one or more audio signals. In addition, it has been proposed to include a program data signal with each television channel to permit a processor located in the television receiver to execute a program which can interact with the viewer. Such a satellite packet transport system will transmit a plurality of different component signals (e.g. video, audio and program data).

It has also been proposed to provide a low data rate service for slower throughput data transport. For example, a component signal provider may wish to transfer data having a predetermined size, such as a data file for delivery over a predetermined, relatively long, time period. For example, a bank may wish to transmit a block of transactions from one location to another overnight.

In U.S. patent application Ser. No. 08/442,429, entitled A METHOD AND APPARATUS FOR OPERATING A TRANSPORT STREAM ENCODER TO PRODUCE A STREAM OF PACKETS CARRYING DATA REPRESENTING A PLURALITY OF COMPONENT SIGNALS, and filed May 16, 1995, now U.S. Pat. No. 5,574,505 incorporated by reference, a transport packet stream encoder is disclosed which produces a composite packet stream containing a plurality of component signals. The composite packet stream is partitioned into successive groups of packet slots. Each packet slot in a group has associated with it a priority ordered list of acceptable component signals for that packet slot. The data from a selected one of these component signals may be placed in that packet slot. When a packet is to be formed, the priority list associated with that packet slot is traversed in priority order, and the first component signal source which has enough data waiting to be transmitted to fill a packet is assigned to fill that packet slot. If none of the component signal sources in the priority list have enough data, then a null packet is produced in that packet slot. The priority lists are generated in such a manner as to provide the level of throughput which the providers of the component signals have purchased from the transport provider.

As stated in that application, this arrangement gives the flexibility to assign a high priority to low data rate components, and a low priority to high data rate components in a packet slot. This permits low data rate signals sufficient access to packet slots to maintain their required throughput, while allowing those slots to be filled by high data rate component data if the low data rate component does not have sufficient data available to fill a packet, and thus avoid the generation of a wasteful null packet.

However, in such a packet transport system carrying many component signals, the throughput required by some of the component signals varies dynamically. U.S. patent application Ser. No. 08/576,527, entitled OPTIMIZING PERFORMANCE IN A PACKET SLOT PRIORITY PACKET TRANSPORT SYSTEM, and filed Dec. 21, 1995, now U.S. Pat. No. 5,729,292 incorporated by reference, discloses a transport stream encoder which may be dynamically optimized to the current required throughput of the component signals carried by the packet stream. The packet transport system disclosed in this application is similar to that disclosed in 08/442.429 except that the contents of the plurality of priority lists may be dynamically updated based on some predetermined parameter.

For example, such a transport stream encoder can adapt its operation to changing throughput requirements of the various component signals due to scheduled changes in programming, and thus optimize its operation, e.g. providing the throughput required by each component while minimizing the number of null packets. A clock may provide a signal to such a system to indicate when the programming has changed (such as at the hour and half-hour). When the clock signal is received, the priority lists are updated to optimally configure the packet transport system for the new mix of component signal sources, and their content.

Alternatively, the priority lists may be updated based on the content of the packet stream. In such a transport stream encoder, each packet produced by the packet stream encoder is analyzed by a data collector to determine the identity of the component signal source whose data is contained in that packet. The entries in the plurality of lists are updated in response to the gathered data, for example, to take advantage of a lull in the data rate of one component signal. In this case, the entries in the plurality of lists are updated to decrease the priority of the component signal experiencing a lull, thereby increasing the priorities of the other component signals. In this manner, the operation of the transport stream encoder may be optimized to the instantaneous changes in the data rate of the component signal sources.

Referring again to the example of a bank desiring to transmit a file of transactions from one location to another overnight, the packet transport stream encoder of either 08/442,429 or 08/576,524 may be used to perform this transfer. By placing an entry corresponding to the bank data component signal source at the bottom of each priority list, when no other component signal has enough data to form a packet in that packet slot, a packet containing some of the bank data will be formed and transmitted, instead of a null packet. Because a null packet will never be transmitted so long as there is bank data to transmit, all generated packets will carry data. The transfer of information in this manner is called an opportunistic transfer. But, in the above system, there can be no guarantee that the bank data will be transmitted within a specified time period. It is desirable that a packet transport system be able to provide guaranteed delivery of opportunistic data within a specified time period.

BRIEF SUMMARY OF THE INVENTION

In accordance with principles of the present invention, a transport stream encoder produces a stream of packets carrying data representing a plurality of component signals. One of the component signals is an opportunistic data component signal producing a block of data having a predetermined size to be transferred within a predetermined period of time. A method for operating such a transport stream encoder comprises the following steps. The packet stream is partitioned into successive groups, each group containing a plurality of packet slots. A plurality of priority lists, associated with the plurality of packet slots, is maintained. Each list contains a plurality of entries, and each entry contains data representing a respective one of the plurality of component signals. The packet stream is generated in response to the entries in the plurality of priority lists. The plurality of priority lists is modified in such a manner as to ensure that a packet containing data from the opportunistic data component signal is generated with sufficient time regularity to guarantee that the block of data is transferred within the predetermined time period.

In accordance with another aspect of the invention, a transport stream encoder comprises a plurality of component signal sources. One of the component signals sources is a source of an opportunistic data component signal carrying a block of data having a predetermined size to be transferred within a predetermined period of time. A packet generator is coupled to the plurality of component signal sources, and produces a composite packet stream, partitioned into successive groups containing a plurality of packet slots. A memory stores a plurality of priority lists associated with the plurality of packet slots. Each priority list contains a plurality of entries, and each entry contains data representing a respective one of the plurality of component signal sources. A scheduler is responsive to the entries in the plurality of priority lists and conditions the packet generator to generate a packet for each one of the packet slots. The generated packet contains data from a component signal source selected from among the component signal sources having representative data in the entries in the priority list associated with that packet slot. A processor modifies the entries in the plurality of priority lists in such a manner as to ensure that a packet containing data from the opportunistic data component signal source is generated with sufficient time regularity to guarantee that the block of data is transferred within the predetermined time period.

DETAILED DESCRIPTION

Figure 1:
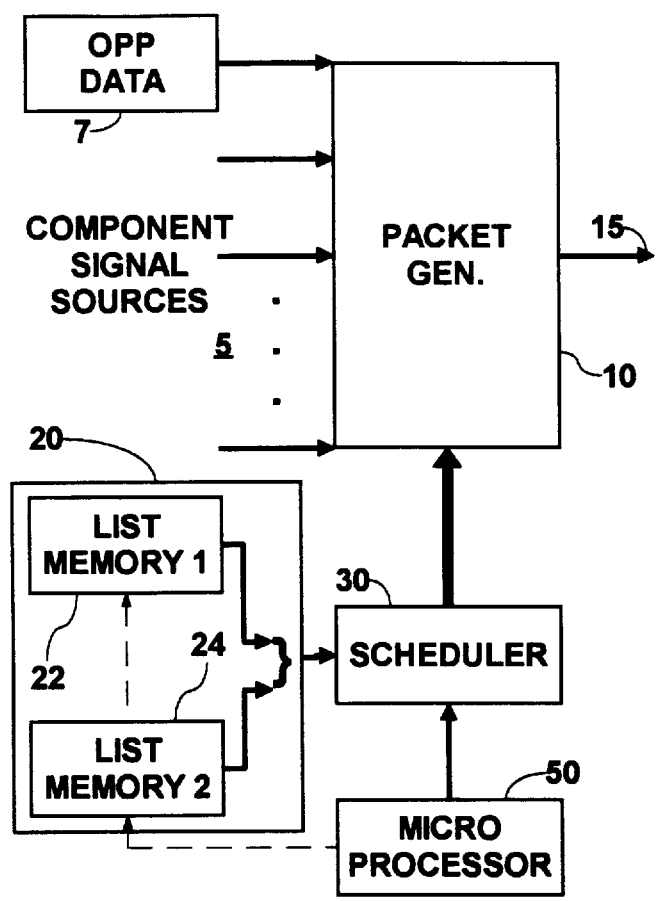
FIG. 1 is a block diagram of a transport stream encoder incorporating the present invention.

FIG. 1 is a block diagram of a transport stream encoder incorporating the present invention. In FIG. 1, a plurality of component signal sources are coupled to respective corresponding input terminals 5. An output terminal of an opportunistic data signal source 7 is coupled to one of the input terminals 5, and produces a signal for carrying a predetermined amount of data, such as a data file of a predetermined size. No other component signal sources are illustrated. Input terminals 5 are coupled to respective data input terminals of a packet generator 10. An output terminal of the packet generator 10 is coupled to an output terminal 15 of the packet transport stream encoder. Output terminal 15 is coupled to further circuitry (not shown) which, for example, may transmit the signal produced by the packet generator 10 to a remote location.

A schedule list memory 20, includes a first list memory (LIST MEMORY 1) 22, and a second list memory (LIST MEMORY 2) 24. An output terminal of the schedule list memory 20 is coupled to a schedule data input terminal of a scheduler 30. An output terminal of the scheduler 30 is coupled to a control input terminal of the packet generator 10. An output terminal of a microprocessor 50 is coupled to a control input terminal of the scheduler 30.

In one embodiment of the packet transport stream encoder, the scheduler 30 operates as an independent subsystem under the control of the microprocessor 50. In this embodiment, data is written to or read from the list memories 22 and 24 in the schedule list memory 20, and received from or supplied to the microprocessor 50, by the scheduler 30. In an alternate embodiment, the scheduler 30 may be implemented as an I/O device attached to the system bus (not shown) of the microprocessor 50. In this embodiment, the schedule list memory 20 is also coupled to the system bus of the microprocessor 50, indicated in phantom by a signal line from the microprocessor 50 to the scheduler list memory 20. The microprocessor 50 may write data to or read data from the schedule list memory 20 directly through the system bus, and the scheduler 30 may access the schedule list memory 20 using known techniques such as direct memory access (DMA), for example.

Figure 2:
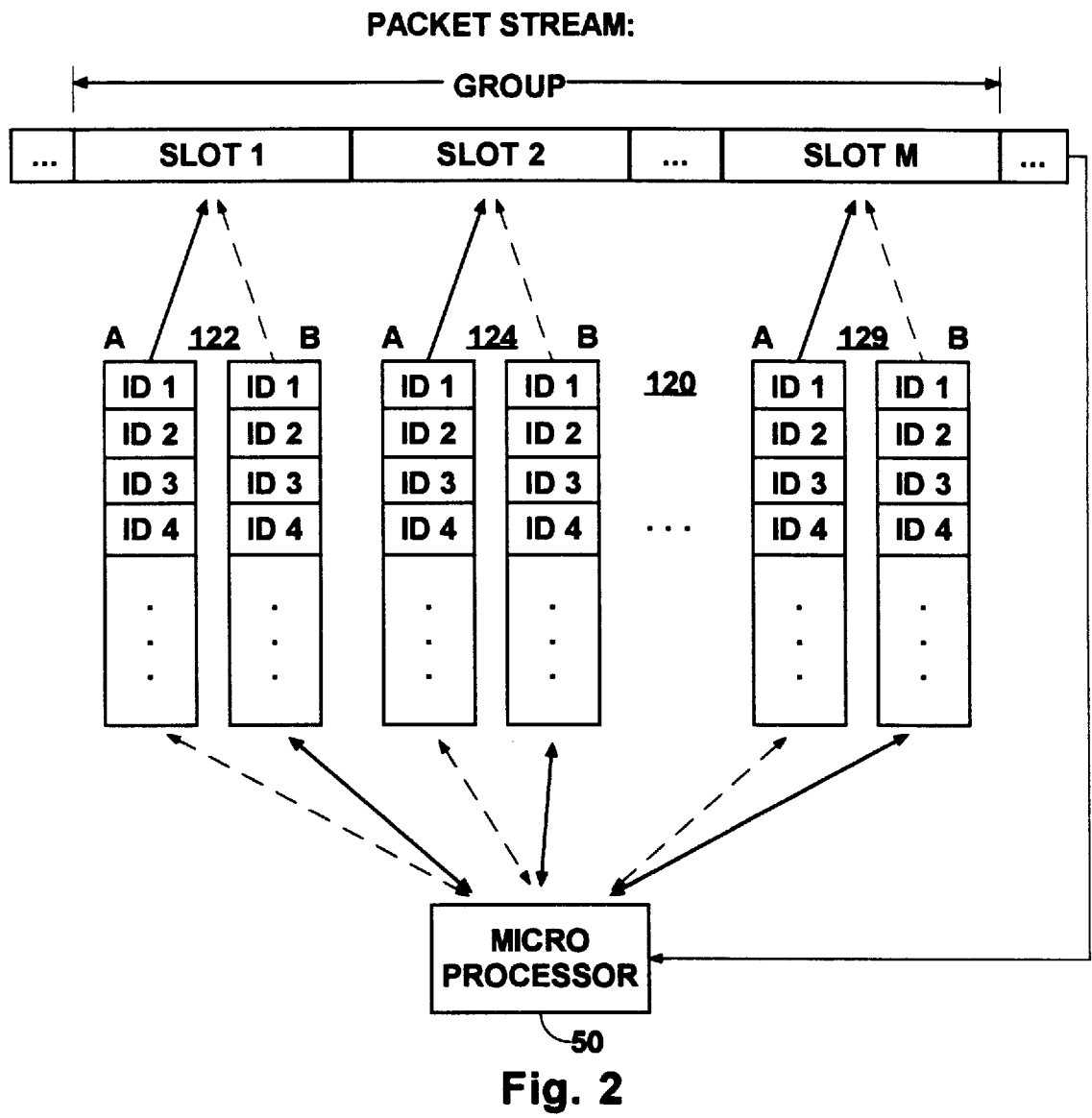
FIG. 2 is a diagram, partially in block diagram form, partially in memory layout form, and partially in waveform form useful in illustrating the operation of the transport stream encoder illustrated in FIG. 1.

FIG. 2 is a diagram useful in illustrating the operation of the transport stream encoder illustrated in FIG. 1. In operation, the packet generator 10 produces a packet stream containing a series of packets, each either containing data from one of the component data sources (of FIG. 1) or being a null packet containing no data. The packet stream is illustrated at the top of FIG. 2 as a series of rectangles. This packet stream is divided into successive groups, each group containing M packet slots. A single group of packet slots is illustrated in FIG. 2. The first packet slot in the group is labeled SLOT 1, the second is labeled SLOT 2, and the last is labeled SLOT M. The successive groups of packets repeat in the packet stream, so that the last packet slot before the group illustrated in FIG. 2 is SLOT M of the preceding group, and the next packet slot after the group illustrated is SLOT 1 of the succeeding group.

Each packet slot has associated with it a priority list. The schedule list memory 20 (of FIG. 1) contains the data making up these priority lists 120. A first set of priority lists, 122 A, 124 A . . . 129 A, is stored in the first list memory 22 in the schedule list memory 20. In FIG. 2, SLOT 1 has associated with it the priority list 122 A, indicated by an arrow running from priority list 122 A to SLOT 1. Similarly, SLOT 2 has associated with it the priority list 124 A, and SLOT M has associated with it the priority list 129 A. Each priority list contains a plurality of entries stored in priority order. The number of entries in any list need not be the same as the number of entries in any other one of the lists. In FIG. 2, the topmost entry in each priority list is assigned the highest priority; the second entry is assigned the next highest priority, and so forth.

Each entry in the list contains an identifier of a component signal source (of FIG. 1). The component signal sources have respectively unique identifiers associated with them. The top entry ID1 in the priority list 122 A can be set to contain the identifier of any of the component signal sources; the second entry ID2 in the priority list 122 A can also contain the identifier of any of the component signal sources, and so forth. Similarly, all the entries IDx in the priority lists 122 A, 124 A and 129 A can contain the identifier of any of the component signal sources.

The packet generator 10 contains, in a known manner, a plurality of FIFO buffers (not shown), respectively coupled to the component signal sources. When a component signal source is being sought for SLOT 1, the scheduler 30 scans the priority list 122 A, associated with SLOT 1, from top to bottom. The FIFO associated with the component signal source identified by the first entry ID1 in the priority list 122 A is checked. If there is sufficient data in that FIFO to form a complete packet, then the scheduler 30 conditions the packet generator 10 to extract the data from that FIFO, and form a packet in SLOT 1 containing that data. If there is not sufficient data in that FIFO to form a complete packet, then the FIFO associated with the component signal source identified by the next entry ID2 in the priority list 122 A is checked. If there is sufficient data in that FIFO, the scheduler 30 conditions the packet generator 10 to form a packet containing that data, otherwise the FIFO from the next entry is checked.

This continues until either a FIFO associated with a component signal source identified by an entry in the priority list 122 A is found to contain sufficient data to form a packet; or no such FIFO is found, in which case the scheduler 30 conditions the packet generator 10 to produce a null packet. The above process is then repeated for SLOT 2, in which the priority list 124 A is scanned from top to bottom, and then, in succession, for every other packet slot in the group of packet slots, through to SLOT M, in which the priority list 129 A is scanned. The entire procedure then repeats for the succeeding group, starting again with the priority list 122 A.

In FIG. 2, a second set of priority lists, 122 B, 124 B . . . 129 B is stored in the second list memory 24 in the schedule list memory 20. The second set of priority lists, 122 B, 124 B and 129 B, is associated with the microprocessor 50, as indicated by the arrows running between those priority lists and the microprocessor 50. These lists correspond in structure to the first set of priority lists 122 A, 124 A and 129 A, respectively. The microprocessor 50 can read and/or write component signal source identifiers into the entries of the second set of priority lists in such a manner as to adapt the contents of the packet slots.

When the second set of priority lists generated by the microprocessor 50 is complete, then the scheduler 30 (of FIG. 1) is conditioned by the microprocessor 50 to take its priority data from the second set of priority lists 122 B, 124 B and 129 B. This is indicated in phantom in FIG. 2 by dashed arrows from priority list 122 B to SLOT 1, priority list 124 B to SLOT 2 and priority list 129 B to SLOT M. At the same time, the first set of priority lists 122 A, 124 A and 129 A becomes associated with the microprocessor 50, as indicated in phantom by the dashed arrows between the priority lists 122 A, 124 A and 129 A, and the microprocessor 50. In a similar manner to that described above, the microprocessor 50 now updates the entries in the first set of priority lists, 122 A, 124 A and 129 A, while the scheduler 30 is accessing the second set of priority lists 122 B, 124 B and 129 B. The microprocessor 50 controls which of the list memories, 22 or 24, is processed by the scheduler 30, while updating the other.

The opportunistic data component signal source 7 produces a signal containing successive data samples representing a block of opportunistic data having a predetermined size. The owner of this data contracts with the packet transport system provider to transmit this block of data within a predetermined time period. The number of packets necessary to carry this data is calculated by dividing the size of the data by the amount of data carried in each packet. For example, if the opportunistic data is one million bytes, and each packet carries 100 bytes, then ten thousand packets are necessary to transmit the data. Then an interval between packets is calculated by dividing the time period by the number of packets. Continuing the above example, if the block of opportunistic data is to be transmitted within 8 hours (28,800 seconds) then a packet must be transmitted at least every 2.88 seconds.

A real time clock (not shown) in the microprocessor 50 is set to notify the microprocessor 50 every 2.88 seconds. In response to that notification, the microprocessor 50 inserts an entry corresponding to the opportunistic component signal source 7 into the highest priority entry in at least one of the priority lists 22 or 24, then causes the scheduler 30 to use the priority lists containing the newly inserted entry to generate a packet group. In this manner, a packet of data from the opportunistic data source is placed in the packet stream. After this packet is produced, the microprocessor 50 causes the scheduler 30 to form packet groups from the original set of priority lists, until the next time the microprocessor 50 is notified by the real time clock that an opportunistic packet is required. In this manner the opportunistic component signal source 7 is guaranteed a minimum throughput rate which will ensure that all the data will be transmitted within the predetermined time period.

In addition, an entry corresponding to the opportunistic component signal source 7 may be placed in the lowest priority entry of every priority list for every packet slot. In this manner, if none of the other component signal sources for that packet slot are able to fill that slot, a packet is inserted carrying the opportunistic data, instead of a null packet. If any such packet slot is produced containing opportunistic data, the opportunistic data will be transmitted sooner than the final time for delivery, but the data is still guaranteed to be delivered within the predetermined time period. Alternatively, the number of packets of opportunistic data produced in this non-scheduled manner may be tracked. So long as the required throughput is maintained in this manner, it is not necessary that a packet of opportunistic data be scheduled, as described above.

What is claimed is:

1. A method for operating a transport stream encoder producing a stream of packets carrying data representing a plurality of component signals, the plurality of component signals including an opportunistic data component signal producing a block of data having a predetermined size to be transferred within a predetermined period of time, the method comprising the steps of:

partitioning the packet stream into successive groups containing a plurality of packet slots;

maintaining a plurality of priority lists, respectively associated with the plurality of packet slots, each list containing a plurality of entries, each entry containing data representing one of said plurality of component signals;

generating the packet stream in response to the entries in the plurality of priority lists; and modifying the plurality of priority lists in such a manner as to ensure that a packet containing data from the opportunistic data component signal is generated with sufficient time regularity to guarantee that the block of data is transferred within the predetermined time period.

2. A method for operating a transport stream encoder producing a stream of packets carrying data representing a plurality of component signals, the plurality of component signals including an opportunistic data component signal producing a block of data having a predetermined size to be transferred within a predetermined period of time, the method comprising the steps of:

partitioning the packet stream into successive groups containing a plurality of packet slots;

maintaining a plurality of priority lists, respectively associated with the plurality of packet slots, each list containing a plurality of entries, each entry containing data representing one of said plurality of component signals;

generating the packet stream in response to the entries in the plurality of priority lists; and modifying the plurality of priority lists in such a manner as to ensure that a packet containing data from the opportunistic data component signal is generated with sufficient time regularity to guarantee that the block of data is transferred within the predetermined time period;

wherein the modifying step comprises the step of placing one of said entries containing data representing the opportunistic data component signal in the highest priority entry in one of the plurality of priority lists so that said packet containing the opportunistic data is generated in the next successive group of packets.

3. The method of claim 2 wherein the modifying step further comprises the step of removing the entry containing data representing the opportunistic data component signal from the highest priority entry of the one of the plurality of priority lists after the packet containing the opportunistic data is generated in the next successive group of packets.

4. A method for operating a transport stream encoder producing a stream of packets carrying data representing a plurality of component signals, the plurality of component signals including an opportunistic data component signal producing a block of data having a predetermined size to be transferred within a predetermined period of time, the method comprising the steps of:

partitioning the packet stream into successive groups containing a plurality of packet slots;

maintaining a plurality of priority lists, respectively associated with the plurality of packet slots, each list containing a plurality of entries, each entry containing data representing one of said plurality of component signals;

generating the packet stream in response to the entries in the plurality of priority lists;

modifying the plurality of priority lists in such a manner as to ensure that a packet containing data from the opportunistic data component signal is generated with sufficient time regularity to guarantee that the block of data is transferred within the predetermined time period;

determining a number of packets necessary to carry the block of opportunistic data;

determining a time interval between packets necessary to generate the determined number of packets within the predetermined period of time; and wherein:

the modifying step comprises the step of modifying the plurality of priority lists once within each determined time interval.

5. A method for operating a transport stream encoder producing a stream of packets carrying data representing a plurality of component signals, the plurality of component signals including an opportunistic data component signal producing a block of data having a predetermined size to be transferred within a predetermined period of time, the method comprising the steps of:

partitioning the packet stream into successive groups containing a plurality of packet slots;

maintaining a plurality of priority lists, respectively associated with the plurality of packet slots, each list containing a plurality of entries, each entry containing data representing one of said plurality of component signals;

generating the packet stream in response to the entries in the plurality of priority lists;

modifying the plurality of priority lists in such a manner as to ensure that a packet containing data from the opportunistic data component signal is generated with sufficient time regularity to guarantee that the block of data is transferred within the predetermined time period; and placing respective entries, each containing data representing the opportunistic data component signal, in the lowest priority entries of each of the plurality of priority lists so that said packet containing the opportunistic data is generated if no other component signal associated with higher priority entries in each of the priority lists contains sufficient data to form said packet.

6. A transport stream encoder, comprising:

a plurality of component signal sources, including a source of an opportunistic data component signal carrying a block of data having a predetermined size to be transferred within a predetermined period of time;

a packet generator, coupled to the plurality of component signal sources, for producing a composite packet stream, partitioned into successive groups containing a plurality of packet slots;

a memory, storing a plurality of priority lists respectively associated with the plurality of packet slots, each priority list containing a plurality of entries, each entry containing data representing one of said plurality of component signal sources;

a scheduler, responsive to the entries in the plurality of priority lists, for conditioning the packet generator to generate a packet for each one of the packet slots, the packet containing data from a component signal source selected from among the component signal sources having representative data in the entries in the priority list associated with the one of the packet slots; and a processor, for modifying the entries in the plurality of priority lists in such a manner as to ensure that a packet containing data from the opportunistic data component signal source is generated with sufficient time regularity to guarantee that the block of data is transferred within the predetermined time period.

7. A transport stream encoder, comprising:

a plurality of component signal sources, including a source of an opportunistic data component signal carrying a block of data having a predetermined size to be transferred within a predetermined period of time;

a packet generator, coupled to the plurality of component signal sources, for producing a composite packet stream, partitioned into successive groups containing a plurality of packet slots;

a memory, storing a plurality of priority lists respectively associated with the plurality of packet slots, each priority list containing a plurality of entries, each entry containing data representing one of said plurality of component signal sources;

a scheduler, responsive to the entries in the plurality of priority lists, for conditioning the packet generator to generate a packet for each one of the packet slots, the packet containing data from a component signal source selected from among the component signal sources having representative data in the entries in the priority list associated with the one of the packet slots;

a processor, for modifying the entries in the plurality of priority lists in such a manner as to ensure that said packet containing data from the opportunistic data component signal source is generated with sufficient time regularity to guarantee that the block of data is transferred within the predetermined time period; and a real time clock, coupled to and controlled by the processor;

wherein:

the processor further:

determines a number of packets necessary to transfer the block of opportunistic data;

determines a time interval between packets carrying the opportunistic data necessary to transfer the opportunistic data within the predetermined time period;

conditions the real time clock to provide successive clock signals separated by the determined time interval; and responds to clock signals by modifying the entries in the plurality of priority lists to ensure that said packet containing data from the opportunistic data component signal is generated in the next successive group of packets.

8. A transport stream encoder, comprising:

a plurality of component signal sources, including a source of an opportunistic data component signal carrying a block of data having a predetermined size to be transferred within a predetermined period of time;

a packet generator, coupled to the plurality of component signal sources, for producing a composite packet stream, partitioned into successive groups containing a plurality of packet slots;

a memory, storing a plurality of priority lists respectively associated with the plurality of packet slots, each priority list containing a plurality of entries, each entry containing data representing one of said plurality of component signal sources;

a scheduler, responsive to the entries in the plurality of priority lists, for conditioning the packet generator to generate a packet for each one of the packet slots, the packet containing data from a component signal source selected from among the component signal sources having representative data in the entries in the priority list associated with the one of the packet slots; and a processor, for modifying the entries in the plurality of priority lists in such a manner as to ensure that said packet containing data from the opportunistic data component signal source is generated with sufficient time regularity to guarantee that the block of data is transferred within the predetermined time period;

wherein the processor modifies the entries in the plurality of priority lists by placing one of said entries containing data representing the opportunistic data component signal source in the highest priority entry in one of the plurality of priority lists so that said packet containing the opportunistic data is generated in the next successive group of packets.

9. The encoder of claim 8 wherein the processor further modifies the entries in the plurality of priority lists by removing the entry containing data representing the opportunistic data component signal source from the highest priority entry of the one of the plurality of priority lists after the packet containing the opportunistic data is generated in the next successive group of packets.

10. A transport stream encoder, comprising:

a plurality of component signal sources, including a source of an opportunistic data component signal carrying a block of data having a predetermined size to be transferred within a predetermined period of time;

a packet generator, coupled to the plurality of component signal sources, for producing a composite packet stream, partitioned into successive groups containing a plurality of packet slots;

a memory, storing a plurality of priority lists respectively associated with the plurality of packet slots, each priority list containing a plurality of entries, each entry containing data representing one of said plurality of component signal sources;

a scheduler, responsive to the entries in the plurality of priority lists, for conditioning the packet generator to generate a packet for each one of the packet slots, the packet containing data from a component signal source selected from among the component signal sources having representative data in the entries in the priority list associated with the one of the packet slots; and a processor, for modifying the entries in the plurality of priority lists in such a manner as to ensure that said packet containing data from the opportunistic data component signal source is generated with sufficient time regularity to guarantee that the block of data is transferred within the predetermined time period;

wherein each of the plurality of priority lists contains data representing the opportunistic data component signal source in the lowest priority entry so that said packet containing the opportunistic data is generated if no other component signal associated with higher priority entries in each of the priority lists contains sufficient data to form a packet.

11. A transport stream encoder, comprising:

a plurality of component signal sources, including a source of an opportunistic data component signal carrying a block of data having a predetermined size to be transferred within a predetermined period of time;

a packet generator, coupled to the plurality of component signal sources, for producing a composite packet stream, partitioned into successive groups containing a plurality of packet slots;

a memory, storing a plurality of priority lists respectively associated with the plurality of packet slots, each priority list containing a plurality of entries, each entry containing data representing one of said plurality of component signal sources;

a scheduler, responsive to the entries in the plurality of priority lists, for conditioning the packet generator to generate a packet for each one of the packet slots, the packet containing data from a component signal source selected from among the component signal sources having representative data in the entries in the priority list associated with the one of the packet slots; and a processor, for modifying the entries in the plurality of priority lists in such a manner as to ensure that said packet containing data from the opportunistic data component signal source is generated with sufficient time regularity to guarantee that the block of data is transferred within the predetermined time period;

wherein the processor further:

determines a number of packets necessary to carry the block of opportunistic data;

determines a time interval between packets necessary to generate the determined number of packets within the predetermined period of time; and modifies the plurality of priority lists once within each determined time interval.

* * * * *